US012801480B2

(12) United States Patent
Meena et al.

(10) Patent No.: US 12,801,480 B2
(45) Date of Patent: Nov. 17, 2026

(54) AUTOMATED DEVICE RECOVERY WITHOUT PHYSICAL ACCESS

(71) Applicant: Esper.io, Inc., Bellevue, WA (US)

(72) Inventors: Devashish Meena, Bellevue, WA (US); Yadhu Gopalan, Bellevue, WA (US)

(73) Assignee: Esper.io, Inc., Bellevue, WA (US)

(*) Notice: Subject to any disclaimer, the term of this patent is extended or adjusted under 35 U.S.C. 154(b) by 0 days.

(21) Appl. No.: 19/044,978

(22) Filed: Feb. 4, 2025

(65) Prior Publication Data

US 2026/0228078 A1 Aug. 6, 2026

(51) Int. Cl.

| | |
|---|---|
| ***G06F 11/07*** | (2006.01) |
| ***G06F 9/445*** | (2018.01) |
| ***G06F 11/14*** | (2006.01) |
| ***G06F 11/30*** | (2006.01) |

(52) U.S. Cl.

CPC ........ *G06F 11/079* (2013.01); *G06F 9/44505* (2013.01); *G06F 11/0751* (2013.01); *G06F 11/1417* (2013.01); *G06F 11/3051* (2013.01)

(58) Field of Classification Search

CPC ............... G06F 11/079; G06F 9/44505; G06F 11/0751; G06F 11/1417; G06F 11/3051

See application file for complete search history.

(56) References Cited

U.S. PATENT DOCUMENTS 7,734,945 B1 * 6/2010 Levidow ............. G06F 11/0793 714/3
12,019,504 B1 * 6/2024 Silakov ............... G06F 11/0787
12,210,770 B1 1/2025 Patki et al.
12,210,776 B1 1/2025 Kantharaju et al.
2008/0052507 A1 * 2/2008 Chow .................. G06F 21/568 710/22
2018/0246552 A1 * 8/2018 Thompson .......... G06F 11/3093
2024/0334215 A1 10/2024 Pal et al.

(Continued)

OTHER PUBLICATIONS

Kwon et al ("Automatic Detection of Unsafe Dynamic Component Loadings," IEEE Transactions on Software Engineering, vol. 38, No. 2, Mar./Apr. 2012). (Year: 2012).*

*Primary Examiner* — Ashish Thomas
*Assistant Examiner* — Kayo Lisa Rusin
(74) *Attorney, Agent, or Firm* — Dale C. Barr; Constellation Law Group PLLC

(57) ABSTRACT

Techniques and technologies that enable automated device recovery without physical access are disclosed. For example, a device may include a processor and a memory configured to perform operations including: operating a user configuration that includes a user application and an application operating system; detecting a triggering condition during operation of the user configuration indicative of an erroneous operating condition; upon detecting the triggering condition, writing at least some data indicative of an operating state of the user configuration to a shared secure filesystem; rebooting in a recovery operating system, the recovery operating system being configured to boot by default one or more verified components that could not have caused the erroneous operating condition; and operating one or more verified components booted by the recovery operating system to diagnose a cause of the erroneous operating condition using least some data indicative of the operating state of the user configuration.

18 Claims, 7 Drawing Sheets

(56) References Cited

U.S. PATENT DOCUMENTS

| | | | | |
|---|---|---|---|---|
| 2024/0364586 | A1 | 10/2024 | Singh et al. | |
| 2025/0004882 | A1 | 1/2025 | Agrawal et al. | |
| 2025/0021369 | A1 | 1/2025 | Parekh et al. | |
| 2025/0021426 | A1 | 1/2025 | Kwon et al. | |
| 2025/0045061 | A1 | 2/2025 | Montero et al. | |
| 2026/0056537 | A1* | 2/2026 | Gottschalk ......... | G05B 23/0275 |

* cited by examiner

AUTOMATED DEVICE RECOVERY WITHOUT PHYSICAL ACCESS

FIELD OF THE DISCLOSURE

The present disclosure relates generally to mobile device management, and more specifically, to techniques and technologies that enable automated device recovery without physical access, including trouble-shooting, remedial operations, and recovery.

BACKGROUND

Many contemporary business enterprises employ edge devices for a wide variety of purposes, including product sales, inventory management, communications, tracking, record keeping, and other suitable purposes. In general, an edge device may be a computing device that is located at or near a periphery of a network, such as near a source of data, which collects and processes information locally before sending it to a central server or other suitable facility, essentially acting as an interface between the real world and a network of a commercial enterprise. Typical edge devices include certain mobile devices like smartphones, sensors, smart cameras, routers, and other suitable devices. Edge devices may be distinguished from on-premises (or "on-prem") devices which are typically understood to include that hardware and software that a company owns and manages within its own physical location, such as servers, storage devices, networking equipment, data centers (e.g. company owned or cloud provider), and other IT infrastructure.

Edge devices (or EDs) generally operate in environments that may be physically inaccessible and relatively insecure in comparison with the operating environments of on-prem devices (OPDs). Additionally, due to the domain-specific nature of EDs, these devices usually solve specific problems like point of sale (POS) solutions, digital kiosks, advertisement boards in public locations, healthcare solutions, etc. These functionalities are typically different from OPDs which generally provide a generic platform to run heterogeneous applications and workloads.

In addition, EDs may be configured to enable customers to interact with the device and its peripherals, such as cameras, fingerprint readers, voice recorders, motion sensors and the like. Due to this capability, a user application, kernel and hardware drivers of the ED are typically packaged together as a single entity and baked into the device. A possible limitation of this approach is that it increases the risk of such edge devices being rendered inoperable (or "bricked") such as, for example, upon occurrence of one or more operating system (OS) exceptions caused by applications, hardware modules or unexpected user interactions with the system. Accordingly, although desirable results have been achieved using prior art techniques for management of edge devices, there is room for improvement.

SUMMARY

Techniques and technologies that enable automated device recovery without physical access, including troubleshooting, remedial operations, and recovery, are disclosed herein. More specifically, techniques and technologies as disclosed herein may advantageously provide a mechanism to help the operators of edge devices (EDs) to either automatically recover or remotely troubleshoot a "bricked" device without gaining physical access to the device. In addition, techniques and technologies as disclosed herein may provide a relatively low-risk way of automatically troubleshooting edge devices since the user data, settings and configuration on the edge device is not accessed during the automated recovery process.

For example, in some embodiments, a device comprises: at least one processor; a memory operatively coupled to the at least one processor, the memory storing processor-readable instructions configured to perform operations including at least: operating a user configuration that includes a user application and an application operating system; detecting a triggering condition during operation of the user configuration indicative of an erroneous operating condition of the user configuration; upon detecting the triggering condition during operation of the user configuration, writing at least some data indicative of an operating state of the user configuration to a shared secure filesystem; rebooting in a recovery operating system, the recovery operating system being configured to boot by default one or more verified components that could not have caused the erroneous operating condition; and operating one or more verified components booted by the recovery operating system to attempt to diagnose a cause of the erroneous operating condition using least some data indicative of the operating state of the user configuration obtained from the shared secure filesystem.

In some embodiments, the operations further comprise: operating one or more verified components booted by the recovery operating system to attempt to remedy the cause of the erroneous operating condition. And in some embodiments, the operations further comprise: rebooting the user configuration using the application operating system following the attempt to remedy the cause of the erroneous operating condition; and re-operating the user configuration using the application operating system.

In addition, in some embodiments, the operating one or more verified components booted by the recovery operating system to attempt to diagnose a cause of the erroneous operating condition using least some data indicative of the operating state of the user configuration obtained from the shared secure filesystem comprises: operating one or more scripts to attempt to diagnose the cause of the erroneous operating condition using least some data indicative of the operating state of the user configuration obtained from the shared secure filesystem comprises.

Alternately, in some embodiments, a device comprises: at least one processor; a memory operatively coupled to the at least one processor, the memory storing processor-readable instructions configured to perform operations including at least: booting a user configuration using an application operating system, the user configuration including at least a user application configured to operate on the application operating system; operating the user configuration using the application operating system; monitoring data related to the operation of the user configuration; detecting a triggering condition during operation of the user configuration indicative of an erroneous operating condition of the user configuration; rebooting in a recovery operating system, the recovery operating system being configured to boot by default one or more analysis components configured to attempt to remedy the erroneous operating condition, the recovery operating system being further configured to not boot by default any components that were booted by the application operating system that could have caused the erroneous operating condition; and operating one or more analysis components booted by the recovery operating system to attempt to diagnose a cause of the erroneous operating condition.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

BRIEF DESCRIPTION OF THE DRAWINGS

Embodiments of methods and systems in accordance with the teachings of the present disclosure are described in detail below with reference to the following drawings.

DETAILED DESCRIPTION

Techniques and technologies that enable automated device recovery without physical access, including troubleshooting, remedial operations, and recovery are described in the following disclosure. Many specific details of certain embodiments are set forth in the following description and in FIGS. 1-8 to provide a thorough understanding of such embodiments. One skilled in the art will understand, however, that the invention may have additional embodiments, or that alternate embodiments may be practiced without several of the details described in the following description.

Embodiments of techniques and technologies that enable automated device recovery without physical access as disclosed herein may advantageously provide a mechanism to help the operators of edge devices (EDs) to either automatically recover or remotely troubleshoot a "bricked" device without gaining physical access to the device. The improved functionality may be provided, for example, by introducing an additional operation when setting up or provisioning the edge device to provide the desired functionality, as described more fully below. Since provisioning of the edge device is typically performed in a controlled environment (e.g. a warehouse or other controlled facility) before the edge devices are shipped to their final locations, the provisioning of the improved functionality into the edge device does not interfere with the end user experience.

More specifically, in some embodiments, systems and methods as disclosed herein may include provisioning a device (e.g. an edge device) with both an application operating system and a recovery operating system. The application operating system may be configured to operate a user configuration that includes a user application that performs the user-specified operations on the device. When a triggering condition is detected during operation of the user configuration indicative of an erroneous operating condition of the user configuration, the device may enter a recovery mode which boots the recovery operating system. In some embodiments, the recovery operating system is configured to boot by default one or more verified components that could not have caused the erroneous operating condition. The recovery operating system operates one or more verified components to attempt to diagnose a cause of the erroneous operating condition using least some data indicative of the operating state of the user configuration obtained from a shared secure filesystem. Upon diagnosis of the cause of the erroneous operating condition, the recovery operating system may also take action to attempt to remedy the cause of the erroneous operating condition. The device may then be rebooted in the application operating system and the user configuration may resume normal operations. Additional aspects of techniques and technologies that enable automated device recovery without physical access are described more fully below.

Figure 1:
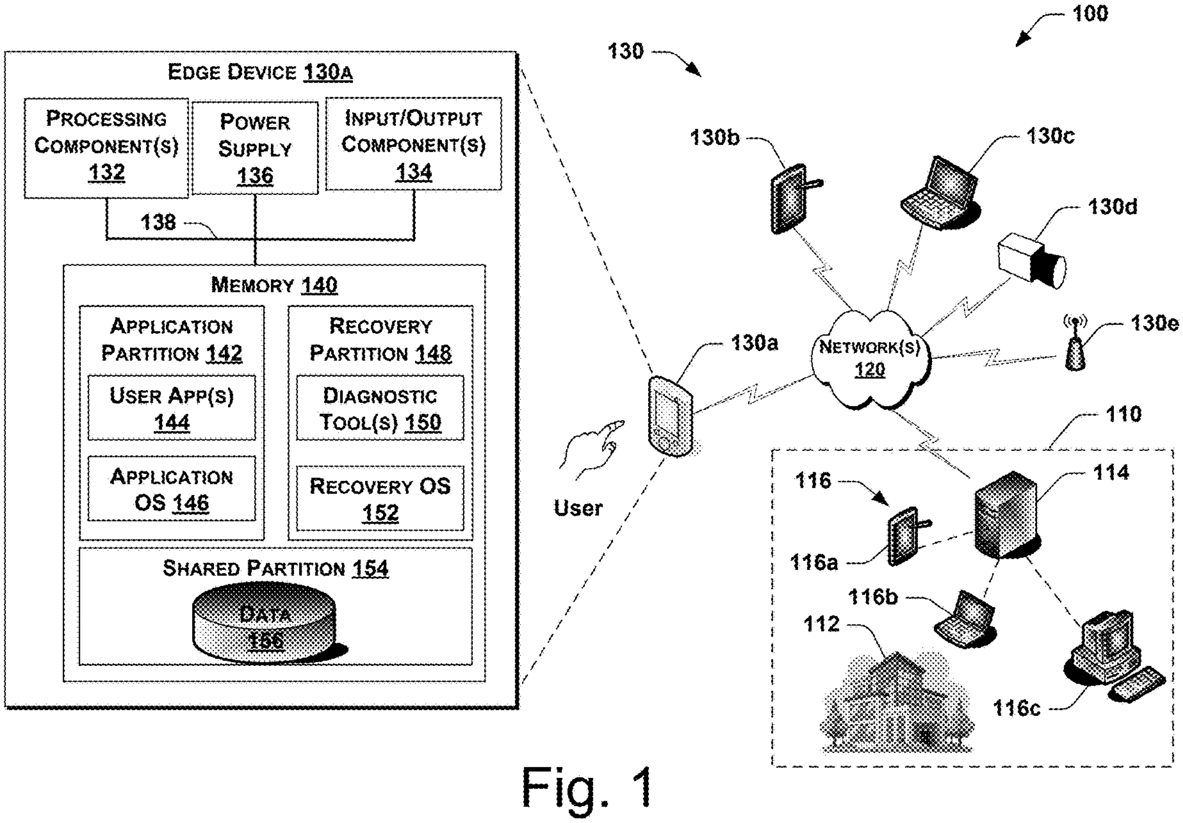
FIG. 1 shows an embodiment of an environment for implementing techniques and technologies in accordance with the present disclosure.

FIG. 1 is an embodiment of a representative environment 100 for implementing techniques and technologies in accordance with the present disclosure. In this embodiment, the representative environment 100 includes a facility 110 which may include an office building 112 from which various operations are performed or managed, such as, for example, those operations performed or managed by an information technology (IT) department of a business enterprise. In some embodiments, the facility 110 includes one or more management devices 114 (one shown) which may be used to perform various management operations as described herein, including but not limited to various mobile device management operations. In the particular embodiment shown in FIG. 1, the management device 114 is depicted as a server, however, it will be appreciated that the management device 114 may have a variety of suitable configurations. In some embodiments, the facility 110 may further include one or more on-prem devices (OPDs) 116 that operate on the premises of the facility 110 subject to the operations and control by the management device 114. For example, in some embodiments, the on-prem devices 116 of the facility 110 may include a tablet 116*a*, a laptop 116*b*, a desktop 116*c*, or any other suitable devices.

As further shown in FIG. 1, the representative environment 100 further includes a plurality of edge devices 130 that are operatively coupled to the management device 114 of the facility 110 via one or more networks 120. The one or more networks 120 may include wireless or wired networks (or both, or combinations thereof), and may enable signals to be communicated between the management device 114 and the edge devices 130.

It will be appreciated that edge devices 130 may have a variety of suitable embodiments, and that the inventive techniques and technologies disclosed herein are not limited to the particular edge devices 130 described herein and shown in the accompanying drawings. For example, in the environment 100 shown in FIG. 1, the edge devices 130 include a mobile phone (or smartphone) 130*a*, a tablet 130*b*, a laptop computer 130*c*, a camera 130*d*, and a sensor 130*e*. The edge devices 130 shown in FIG. 1 are merely representative embodiments, however, and any other suitable embodiments of edge devices 130 may be employed for implementing techniques and technologies as disclosed herein.

In addition, various edge devices 130 may suitably have a variety of different internal configurations or components. For example, in the representative environment 100 shown in FIG. 1, the edge device (or mobile phone) 130*a* includes one or more processing components 132, one or more input/output (I/O) components 134, a power supply 136, and a memory 140, all operatively coupled via a bus 138. The I/O components 134 may include, for example, a display (e.g. a touch-sensitive display), an antenna (e.g. Bluetooth antenna, cellular antenna, transmitter, transceiver, etc.), a keypad, a microphone (e.g. for receiving voice signals or commands), a data port (e.g. USG port, etc.), or any other suitable I/O components. In some embodiments, the mobile phone 130*a* may receive inputs from a user via one or more of the I/O components 134 (e.g. touch screen, keypad, microphone, mouse, keyboard, electronic pen, etc.), and may communicate signals to and/or from the management device 114 (or other devices) via one or more of the I/O components 134 (e.g. USB ports, antennas, transceivers, etc.) to perform various operations, as described more fully below.

As depicted in FIG. 1, in some embodiments, the memory 140 includes an application partition 142 that stores one or more user applications 144 and an application operating system (Application OS) 146. It will be appreciated that the one or more user applications 144 are operated by the user to perform the desired operations of the edge device 130A, and the Application OS 146 is an operating system that is suitably configured to provide the necessary components and functionalities needed to properly operate the one or more user applications 144. For example, in some embodiments, the Application OS 146 may be an Android operating system developed by the Open Handset Alliance and commercially sponsored by Google, Inc. (e.g. AOSP, Android 9, Android 13, etc.).

Similarly, in some embodiments, the memory 140 includes a recovery partition 148 that stores one or more diagnostic tools 150, and a recovery operating system (Recovery OS). In some embodiments, the Recovery OS 152 is different from the Application OS 146, and is not accessible by the one or more user applications 144 that are used by the user during actual use of the edge device 130*a*. More specifically, in some embodiments, a difference between the Recovery OS 152 and the Application OS 146 is that a number of components (e.g. user application 144, hardware drivers, etc.) that are loaded by default in the Application OS 146 are not loaded by default in the Recovery OS 152. In addition, in some embodiments, the memory 140 also includes a shared partition 154 having data 156 that may be accessible by components stored on either the application partition 142 or the recovery partition 148. Additional operational aspects and functionalities of various possible embodiments of the edge device 130*a* are described more fully below.

In some embodiments, the Recovery OS 152 can also be from the same commercial provider as the Application OS 146 (e.g. an Android operating system), however, the Recovery OS 152 is configured to only boot up one or more various components associated with diagnosis, and the Recovery OS 152 does not, by design, have any user-specific components or applications that are booted during normal operations of the edge device 130*a* by the Application OS 146. In some embodiments, the Recovery OS 152 may also not be aware of any such user-specific applications during provisioning. In other words, in some embodiments, the Recovery OS 152 may be aware of the components on the Recovery Partition 148 and the Shared Partition 154, and the Recovery OS 152 may use the data 156 on shared partition 154 to make certain decisions, as described more fully below. In some embodiments, the Recovery OS 152 may be a version of a Linux operating system. For example, in some embodiments, some IOT (Internet-of-Things) devices may run a stripped down, minimal version of a Linux OS as the Application OS 146, and in some embodiments, it may be desirable to have the Recovery OS 152 also be a version of a Linux operating system.

It will be appreciated that the Recovery OS 152 may be a version of operating system that is "hardened" and secured by the administrators before installation onto the edge device 130*a*. For example, in some embodiments, the Recovery OS 152 may be configured to install one or more applications and scripts that are vetted, verified and originate from trusted sources. In some embodiments, the Application OS 146 may install one or more applications from third party stores, custom builds and/or new authors as part of their normal operation, however, operations such as these will not be permitted in Recovery OS 152, which only boots trusted and verified components. In at least some embodiments, because the Recovery OS 152 may read and write data to the shared partition 154 in a format that is compatible with the Application OS 146 (and vice versa), then it may be desirable that both the Recovery OS 152 and the Application OS 146 are configured to read and write information to the shared partition 154 using a mutually understandable format in order to facilitate operations described herein.

Figure 2:
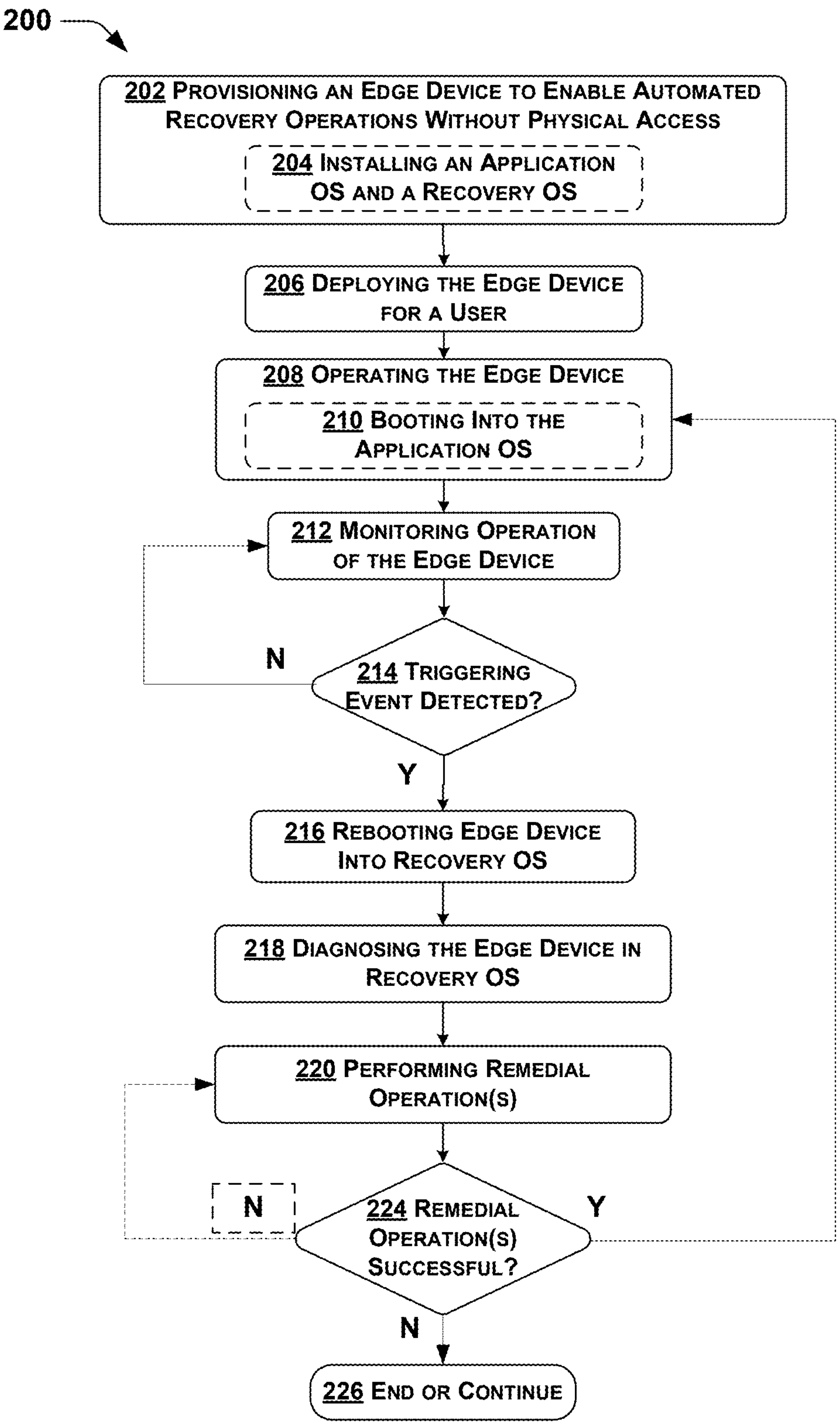
FIG. 2 shows an embodiment of a process of operating an edge device in accordance with the present disclosure.

FIG. 2 is an embodiment of a process 200 in accordance with the present disclosure. In this embodiment, the process 200 includes provisioning an edge device (e.g. edge device 130*a* of FIG. 1) to enable automated recovery operations without physical access at 202. In general, in some embodiments, the provisioning of the edge device (at 202) typically includes installing and configuring relevant software to make the device usable for its intended operations within an operational environment (e.g. environment 100), as described more fully below. More specifically, the provisioning of the edge device (at 202) may include enabling automated recovery operations to be performed on the edge device (e.g. trouble-shooting operations, recovery from error conditions, and other suitable management operations) while the edge device is being used in the field at remote locations that are distal from responsible management personnel, without requiring physical access to the edge device by responsible management personnel (e.g. IT personnel located at the facility 110 of FIG. 1).

As depicted in FIG. 2, in some embodiments, the provisioning of the edge device (at 202) includes installing an application operating system (Application OS) and also installing a recovery operating system (Recovery OS) at 204. For example, in some embodiments, the Application OS (installed at 204) may include components necessary to support the functionalities required by a user of the edge device during actual use, such as user applications and other software components, hardware and peripheral drivers, and any other suitable components. In some embodiments, the Application OS may be configured to catch one or more application and operating system exceptions, and to write such exceptions to a secure shared file system for possible diagnosis and remedial action.

Similarly, the Recovery OS (also installed at 204) is a second operating system that has the same level of access to the hardware and peripherals as the Application OS, however, the Recovery OS differs from the Application OS. More specifically, in some embodiments, the Recovery OS is not accessible by one or more user applications that are used by the user during actual use of the edge device. And in some embodiments, one or more hardware drivers that are loaded by default in the Application OS are not loaded by default in the Recovery OS. Accordingly, in some embodiments, the Recovery OS may be configured to ensure that only verified, trusted and secure components are part of the Recovery OS. Various possible embodiments of installing the Application OS and installing the Recovery OS (at 204) will be described below.

As further shown in FIG. 2, the process 200 may also include deploying the edge device for a user at 206. For example, in some embodiments, the deploying the edge device for a user (at 206) may include providing one or more data or user specifications (e.g. 156 of FIG. 1) that configure the edge device for the user to provide a user-specific configuration. More specifically, in some embodiments, the deploying (at 206) may include specifically tailoring the configuration of the edge device with any desired data, settings, specifications, or operating characteristics that enable the edge device to properly perform the user's specific operations and requirements during actual use in the operating environment. Various possible embodiments of deploying the edge device for a user (at 206) will be described below.

Next, in some embodiments, the process 200 further includes operating the edge device at 208. For example, in some embodiments, the operating the edge device (at 208) may include the user performing one or more operations that the edge device has been configured to perform in actual field operations for a commercial enterprise, such as performing one or more operations associated with a sale of a product, inventory management, communications, tracking, record keeping, or any other suitable purposes. More specifically, in some embodiments, the operating the edge device (at 208) may include using the edge device in the manner in which it was intended to be operated, such as to collect and process information locally before sending it to a central server (e.g. management device 114 of FIG. 1) or other suitable facility. More specifically, in some embodiments, the operating the edge device (at 208) may include booting the edge device into the Application OS at 210. In some embodiments, the booting into the Application OS (at 210) may include booting, loading, and otherwise making operational all of the components necessary to support the functionalities required by the user of the edge device during actual use, such as user applications and other software components, hardware and peripheral drivers, and any other suitable components.

With continued reference to FIG. 2, in some embodiments, the process 200 further includes monitoring operation of the edge device at 212. For example, in some embodiments, the monitoring (at 212) may include at least one of monitoring one or more status conditions detected by a status check daemon, monitoring one or more breadcrumb conditions detected by a breadcrumb check daemon, monitoring one or more user application operating conditions of a user application, or monitoring any other suitable operating condition of the edge device. Various possible embodiments of monitoring operation of the edge device (at 212) will be described below.

In some embodiments, the process 200 includes determining whether a triggering event has been detected at 214. For example, in some embodiments, the determining whether a triggering event has been detected (at 214) may include at least one of determining whether one or more status conditions have been detected by a status check daemon, determining whether one or more breadcrumb conditions have been detected by a breadcrumb check daemon, determining whether one or more application operating conditions of a user application have been detected, or determining whether any other suitable operating condition of the edge device has been detected.

With continued reference to FIG. 2, if it is determined that a triggering event has not been detected (at 214), then in some embodiments, the process 200 returns to monitoring the operation of the edge device (at 212). It will be appreciated that, in some embodiments, the monitoring of the operation of the edge device (at 212) and the determining whether a triggering event has been detected (at 214) may be performed indefinitely as long as the user continues operating the edge device (at 208).

If it is determined, however, that a triggering event has been detected (at 214), then in some embodiments, the process 200 may proceed to rebooting the edge device into the Recovery OS at 216. In some embodiments, the rebooting the edge device into the Recovery OS (at 216) may include rebooting the edge device into the Recovery OS that is not accessible by one or more user applications that are used by the user during actual use of the edge device. In addition, in some embodiments, the rebooting into the Recovery OS (at 216) may include rebooting the edge device into the Recovery OS to ensure that only verified, trusted and secure components are booted, and without one or more hardware drivers that are loaded by default in the Application OS.

As further shown in FIG. 2, the process 200 may further include diagnosing the edge device in the Recovery OS at 218. For example, in some embodiments, the diagnosing (at 218) may include diagnosing the edge device in the Recover OS based on exceptions or data written to a secure shared file system during operation of the edge device in the Application OS (at 208). More specifically, in some embodiments, diagnosing the edge device in the Recover OS (at 218) may include at least one of diagnosing one or more status conditions, diagnosing one or more breadcrumb conditions, diagnosing one or more application operating conditions of a user application, or diagnosing any other suitable operating condition of the edge device.

The process 200 may further include performing a remedial operation at 220. For example, in some embodiments, the performing a remedial operation (at 220) may include adjusting one or more inputs to correct a state or status of the device, adjusting one or more configuration settings to attempt to correct an operating condition of the edge device, or performing any other suitable remedial actions to attempt to improve an operation of the edge device.

In some embodiments, the process 200 further includes determining whether the remedial operation was successful at 224. For example, in some embodiments, the determining whether the remedial operation was successful (at 224) may include at least one of determining whether one or more status conditions have been remedied, determining whether one or more breadcrumb conditions have been remedied, determining whether one or more application operating conditions or exceptions of a user application have been remedied, or determining whether any other suitable operating condition of the edge device has been remedied.

As further depicted in FIG. 2, if it is determined (at 224) that the remedial operation has been successful in resolving the one or more conditions that resulted in the triggering event (at 214), then in some embodiments, the process 200 returns to operating the edge device (at 208). As noted above, in some embodiments, the operating of the edge device (at 208) may include booting (or re-booting) the edge device into the Application OS (at 210). The process 200 may then continue operating the edge device (at 208), monitoring operation of the edge device (at 212) and determining whether a triggering event has been detected (at 214) as described above for as long as the user desires to operate the edge device.

In some embodiments, if it is determined that a remedial operation has not been successful (at 224), then the process 200 may proceed to end or continue to other operations at 226. For example, if the remedial operation has not been successful (at 224), then the user may be required to follow a conventional procedure such as taking the edge device to a designated facility for diagnosis and remedial action to restore the edge device to operational status.

Alternately, in some embodiments, if it is determined that a remedial operation has not been successful (at 224), then the process 200 may return to performing a remedial operation (at 220) to try an alternative approach to resolving an issue. It will be appreciated that, in some embodiments, the performing a remedial operation (at 220) and the determining whether the remedial operation has been successful (at 224) may be performed repeatedly for a predetermined number of attempts, or until all operating issues of the edge device have been resolved, or until all possible remedial actions have been attempted. Eventually, the process 200 may proceed to end or continue to other operations (at 226).

It will be appreciated that the process 200 shown in FIG. 2 is merely one particular implementation, and that various alternate implementations may be conceived in accordance with the present disclosure. For example, it will be appreciated that in alternate embodiments, one or more operations shown in FIG. 2 may be omitted, or combined, or performed in a different order than that shown in FIG. 2. Similarly, in alternate embodiments, one or more additional operations may be performed, such as one or more additional operations described more fully below. Accordingly, it will be understood that the process 200 shown in FIG. 2 is merely exemplary, and that processes in accordance with the present disclosure are not limited to the particular implementation shown in FIG. 2.

Techniques and technologies that enable automated device recovery without physical access as disclosed herein may advantageously provide a mechanism to help the operators of edge devices to automatically recover or troubleshoot a "bricked" device without gaining physical access to the device. For example, by provisioning the device with an additional "recovery" operating system that is separate from the application operating system that is used to run the user configuration, the device is able to enter a recovery mode that is safe from the components that caused the erroneous operating condition. In the recovery mode, one or more trouble-shooting and de-bugging operations may be performed to automatically evaluate, diagnose, and at least attempt to remedy the erroneous operating condition.

In addition, techniques and technologies that enable automated device recovery without physical access as disclosed herein may provide a relatively low-risk way of trouble-shooting devices since the user data, settings and configuration on the device is not accessed during the automated recovery process. In some embodiments, by creating a semi-virtualization layer, techniques and technologies as disclosed herein allow the Recovery OS to strip away all components (e.g. applications, kernel modules, libraries etc.) that are not necessary for running the user application in order to perform the diagnosis of the error condition, enabling the Recovery OS to focus on providing robust tools for recovery and maintenance.

As noted above, techniques and technologies in accordance with the present disclosure may include provisioning a device to enable remote management operations without physical access (at 202), and in some embodiments, the provisioning includes installing an Application OS and also installing a Recovery OS (at 204). Various aspects and embodiments of provisioning a device in accordance with the present disclosure will now be described with reference to FIGS. 3 and 4.

Figure 3:
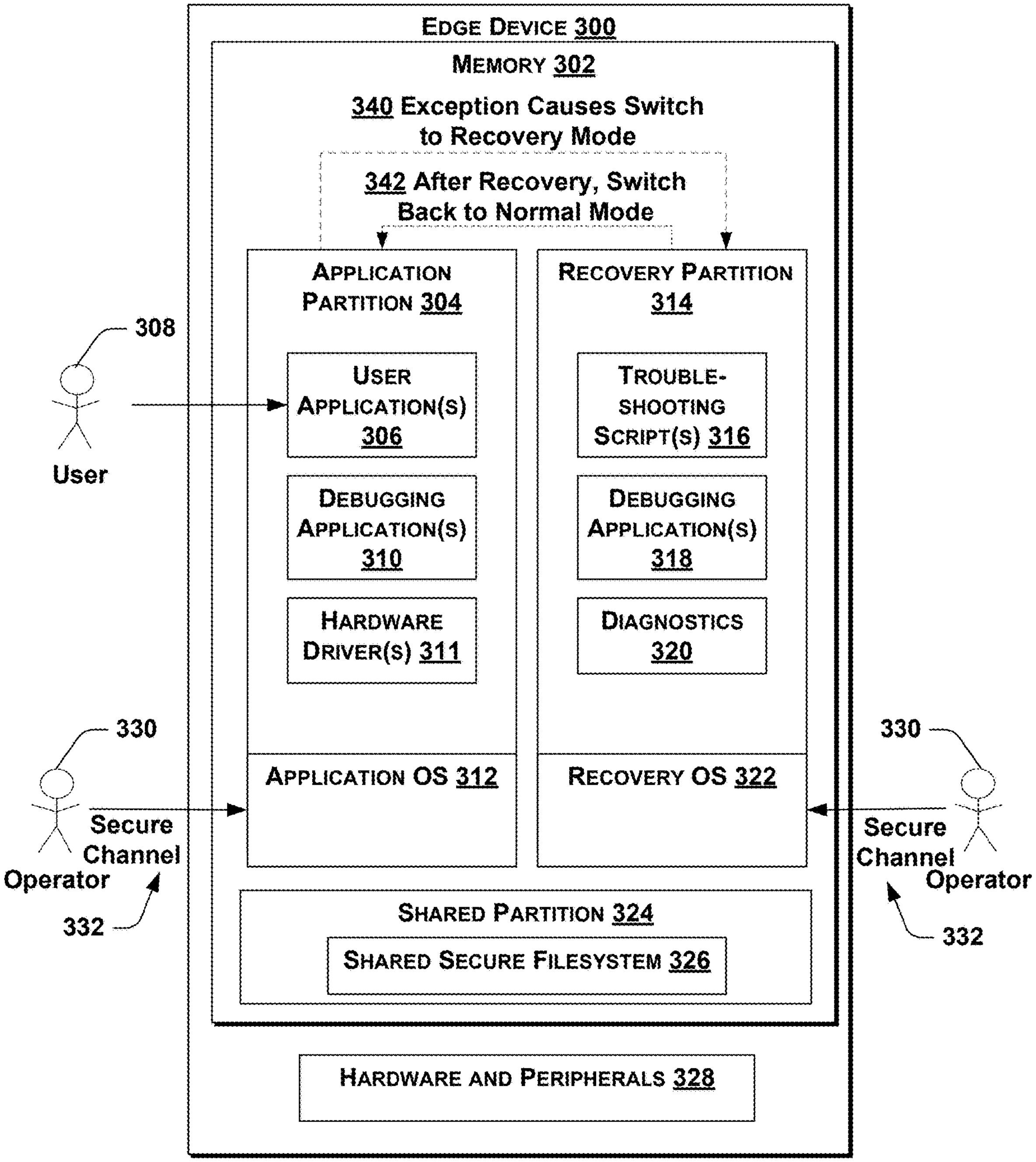
FIG. 3 is a schematic view of an embodiment of an edge device in accordance with the present disclosure.

More specifically, FIG. 3 is a schematic view of an embodiment of an edge device 300 being provisioned in accordance with the present disclosure. In general, the edge device 300 may be any type of device, including but not limited to the edge devices 130 described above and shown in FIG. 1. In some embodiments, the edge device 300 includes a memory 302 having an application partition 304 that stores a user application 306 that a user 308 operates an interacts with to perform the desired operations using the edge device 300 (e.g. sales, record keeping, tracking, etc.). As further shown in FIG. 3, in some embodiments, the application partition 304 also stores one or more debugging applications 310 for monitoring operations of the edge device 300 during use by the user 308. For example, in some embodiments, the one or more debugging applications 310 may include a status check daemon, a breadcrumb check daemon, or any other suitable monitoring or debugging applications.

In addition, in some embodiments, the application partition 304 further stores an application operating system (Application OS) 312 that is configured to boot and make operational all of the components necessary to support the functionalities required by the user during use of the edge device 300, such as the user application 306 and other software components, one or more hardware drivers 311 (also shown in FIG. 3 as being stored within the application partition 304), and any other suitable components. In some embodiments, the one or more hardware drivers 311 may be configured to drive one or more hardware and peripherals 328 of the edge device 300 as desired during use of the user application 306 by the user 308.

Similarly, as further shown in FIG. 3, the memory 302 of the edge device 300 may further include a recovery partition 314 that stores one or more trouble-shooting scripts 316. In some embodiments, the one or more trouble-shooting scripts 316 may be used for various purposes including, for example, analyzing information and diagnosing an operating condition of the edge device 300, or performing a remedial operation to attempt to correct an error condition associated with the edge device 300. In some embodiments, the recovery partition 314 also stores one or more debugging applications 318 that may be used to analyze and diagnose the operating condition of the edge device 300, and to determine which remedial operations to perform to attempt to correct an error condition associate with the edge device 300. For example, in some embodiments, the one or more debugging applications 318 may include a status check daemon, a breadcrumb check daemon, or any other suitable debugging applications. Similarly, in some embodiments, the recovery partition 314 also stores diagnostics 320 that may be used to analyze and diagnose the operating condition of the edge device 300, and to determine which remedial operations to perform to attempt to correct an error condition associate with the edge device 300.

As depicted in FIG. 3, the recovery partition 314 may further store a recovery operating system (Recovery OS) 322. In some embodiments, the Recovery OS 322 is a separate operating system that has the same level of access to the hardware and peripherals as the Application OS 312, however, as noted above, the Recovery OS 322 differs from the Application OS 312. More specifically, in some embodiments, the Recovery OS 322 is not accessible by the one or more user applications 306 that are used by the user 308 during actual use of the edge device 300. And in some embodiments, the one or more hardware drivers 314 that are loaded by default in the Application OS 312 are not loaded by default in the Recovery OS 322. Accordingly, in some embodiments, the Recovery OS 322 may be configured to ensure that only verified, trusted and secure components are part of the Recovery OS 322 such that an error condition that may have been experienced by the edge device 300 during operations using the user application 306 and the Application OS 312 may be avoided by booting the edge device 300 using the Recovery OS 322.

In some embodiments, the diagnostics 320 may be part of the Recovery OS 322 and may include one or more tools that are installed by system administrators during provisioning of the edge device 300. In some embodiments, the diagnostics 320 include tools that may have higher privileges on the system and underlying hardware compared to the debugging applications 310 on the Application OS 312. Moreover, in some embodiments, the Application OS 312 and/or the user application 316 may write one or more exceptions to the shared secure filesystem 326 but those exceptions may be limited to the context of complete Application OS 312 (e.g. at best), or may be a permissions-limited view of the Application OS 312. In some embodiments, the diagnostics 320 on the Recovery OS 322 may not only read the exception information on the shared secure filesystem 326, but may also scale the full view of the Application OS 312 to analyze one or more system level failures at a much deeper level.

In some embodiments, the memory 302 of the edge device 300 further includes a shared partition 324 that stores a shared secure filesystem 326. In some embodiments, the shared secure file system 326 can be a partition in the existing file system, such as on the shared partition 324 as shown in FIG. 3. Alternately, in some embodiments, the shared secure filesystem 326 may be a physically separate, dedicated file system that is separate from the edge device 300.

During actual use of the edge device 300, in some embodiments, one or more components of the edge device 300 (e.g. the Application OS 312) may capture information indicative of an abnormal or non-optimal operating conditions (e.g. exceptions, status information, breadcrumb information, etc.) of the edge device 300, and may securely write such information to the shared secure filesystem 326. In addition, in some embodiments, the information stored in the shared secure filesystem 326 may be accessed by one or more components of the edge device 300 when the Recovery OS 322 is booted in order to analyze and diagnose operating conditions of the edge device 300, and to attempt one or more remedial actions in an attempt to correct the abnormal or non-optimal operating condition of the edge device 300. During operation of the edge device 300, when one or more components of the application partition 304 (e.g. Application OS 312, user application 306) encounters an exception or other anomalous operating condition, then operations may switch to a recovery mode (as indicated by arrow 340). After recovery mode operations have been performed by one or more components of the recovery partition 314 (e.g. Recovery OS 322, trouble-shooting scripts 316, etc.), then operations may switch back to normal mode (as indicated by arrow 342), as described more fully below.

As further shown in FIG. 3, in some embodiments, an operator 330 (e.g. IT department personnel at the facility 110 of FIG. 1), may communicate with the Application OS 312 or with the Recovery OS 322 via a secure channel 332. For example, in some embodiments, the operator 330 may access the edge device 300 using credentials, keys etc. to communicate securely between the facility (e.g. the management device 114) and the edge device 300. In some embodiments, the secure channel 322 may be used to send and receive telemetry information, providing a bidirectional channel for the operator 330 to perform one or more desired operations including, for example, debugging any application issues or performing diagnostics checks from time to time.

Figure 4:
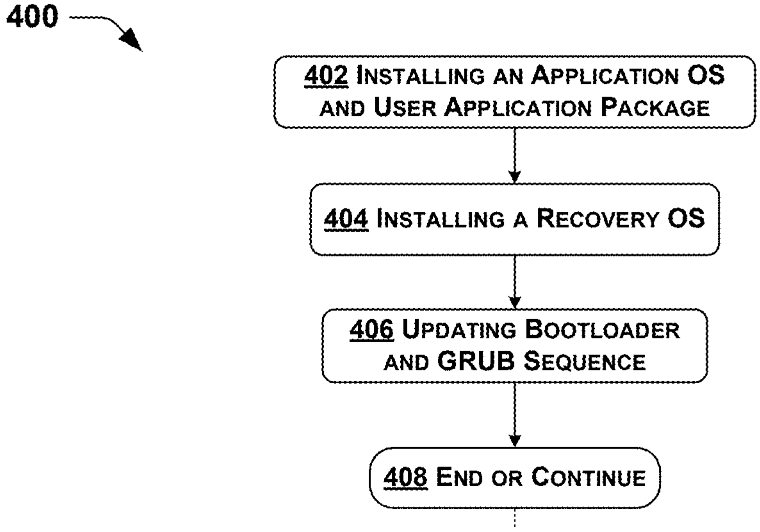
FIG. 4 shows an embodiment of a provisioning process in accordance with the present disclosure.

FIG. 4 is an embodiment of a provisioning process 400 for provisioning an edge device to enable remote management operations without physical access. In some embodiments, the provisioning process 400 includes installing an Application OS and a User Application package at 402. More specifically, in some embodiments, the installing (at 402) may include installing the Application OS and the User Application package onto the application partition 304 (see FIG. 3). For example, in some embodiments, the Application OS (e.g. Application OS 312) may be a commercially-available operating system (e.g. an Android operating system) of the type typically installed on edge devices to provide proper operation of user applications. In addition, the User Application package (installed at 402) may include the customer-facing user application (e.g. user application 308) and any related components that are stored on the application partition 304 and that are loaded by the Application OS 312 to enable the user 308 to perform the desired operations with the edge device 300. For example, with reference to FIG. 3, the User Application package (installed at 402) may include the user application(s) 306, the debugging application(s) 310, the hardware driver(s) 311 (including any hardware drivers provided with by the manufacturer of the edge device 300, by third party vendors, etc.), and any other components that are stored on the application partition 304 that are loaded by the Application OS 312 during booting of the edge device 300 and that are necessary to provide the user 308 with the desired operational capabilities of the edge device 300. In conventional provisioning of edge devices in accordance with the prior art, the installing of the Application OS and the User Application package (at 402) may be the only provisioning operations needed, after which the edge device 300 may be considered usable after any user/customer specific information is injected during the deployment process, described more fully below.

In some embodiments, the Application OS 312 (installed at 402) is configured to catch all user application 305 and Application OS 312 exceptions and to write them to the secure shared filesystem 326 on the shared partition 324. More specifically, in some embodiments, the Application OS 312 (installed at 402) may be configured to constantly (or periodically, or at other times) run a status check background process that uses, for example, a watchdog timer to notify the Application OS 312 that everything is (or is not) working as expected.

As further shown in FIG. 4, the provisioning process 400 in accordance with the present disclosure further includes installing a Recovery OS at 404. In some embodiments, the Recovery OS 322 (installed at 404) is a second operating system that has the same level of access to the hardware and peripherals as the Application OS 312 (installed at 402). In some embodiments, however, the Recovery OS 322 (installed at 404) is not accessible by the user application(s) 306 that is operated by the user 308 during actual use of the edge device 300. More specifically, in some embodiments, the hardware driver(s) 311 that are loaded by default during boot by the Application OS 312 are not loaded by default during boot by the Recovery OS 322. Accordingly, in some embodiments, the Recovery OS 322 may be configured to ensure that only verified, trusted and secure components are booted by the Recovery OS 322, which may advantageously ensure that the edge device 300 does not enter into a failed (or "bricked") operating state during boot by the Recovery OS 322.

Also, in some embodiments, the Recovery OS 322 (installed at 404) may share the shared secure filesystem 326 with the Application OS 312, through which it may access the user/customer specific configuration details and other operational metadata that are indicative of the operational state of the edge device 300. As noted above, in some embodiments, the shared secure file system 326 may be a physically separate, dedicated file system, or alternately, it can be a partition in the existing file system, such as on the shared partition 324 as shown in FIG. 3. In some embodiments, the Recovery OS 322 may contain (or be configured to operate) software and/or other components (e.g. troubleshooting script(s) 316, debugging application(s) 318, diagnostic(s) 320, etc.) that may be selected or provided by the operator 330, and that may be suitable for debugging and troubleshooting operations.

With continued reference to FIG. 4, in some embodiments, the provisioning process 400 further includes updating a bootloader and GRUB (Grand Unified Bootloader) sequence at 406. Specifically, in some embodiments, the updating of the bootloader and GRUB sequence (at 406) may include updating the sequence of operations during boot of the edge device 300 to dynamically decide which operating system to load (either Application OS 312 or Recovery OS 322). For example, in some embodiments, the bootloader and GRUB sequence may be updated (at 406) to provide that the Recovery OS 322 is the default operating system to boot, and if one or more bootloader check operations indicate an issue with the operational status of the edge device 300 then the Recovery OS 322 is chosen, but if one or more bootloader check operations indicate that there is no issue with the operational status of the edge device 300 then the Application OS 312 is chosen. In still further embodiments, the bootloader and GRUB sequence may be updated (at 406) with any other suitable conditions, operations, or boot sequences. After updating the bootloader and GRUB (Grand Unified Bootloader) sequence (at 406), the provisioning process 400 may end or continue to other operations at 408.

Figure 5:
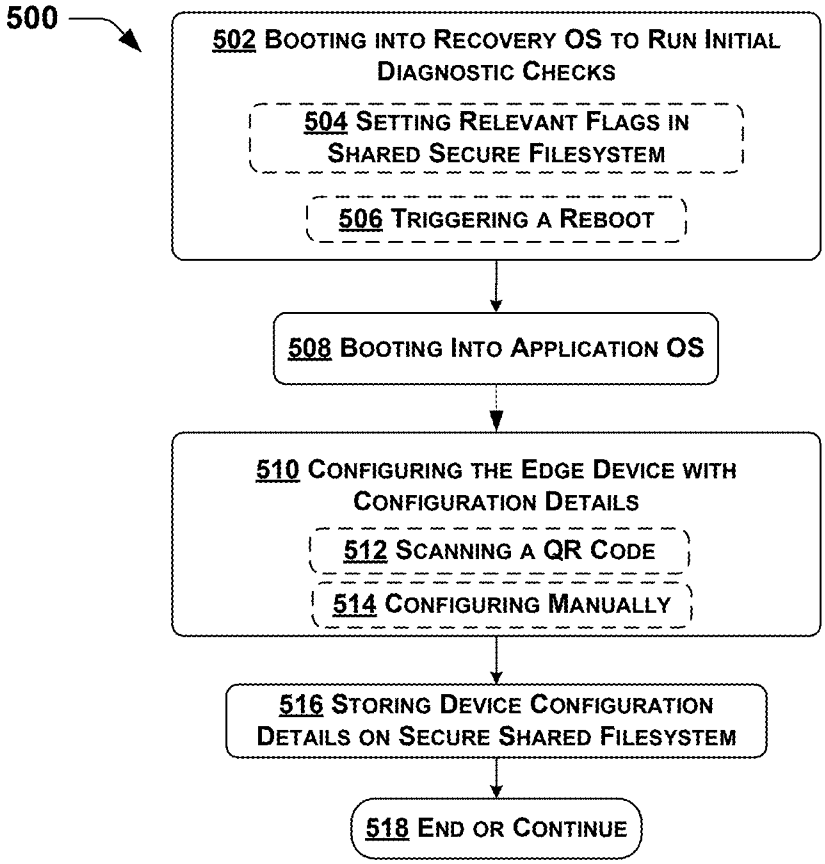
FIG. 5 shows an embodiment of a deploying process in accordance with the present disclosure.

As noted above, following provisioning of the edge device 300 to enable remote management operations without physical access (at 202 of FIG. 2), the edge device 300 may be deployed for the user (at 204 of FIG. 2). For example, FIG. 5 shows an embodiment of a deploying process 500 to provide a user-specific configuration to the edge device 300 in accordance with the present disclosure. In some embodiments, the deploying process 500 may be performed after the edge device 300 has been shipped to the user 308 (e.g. at the user's facility) wherein various configuration settings (e.g. wifi setup, SSO sign in, APO key configuration, etc.) may be specified to tailor the configuration of the edge device 300 to the user 308. Alternately, in some embodiments, the deploying process 500 may be performed prior to delivery of the edge device 300 to the user 308, such as when the user 308 requests a vendor of the edge device 300 to hardcode configuration information into the edge device 300 prior to delivery to the user 308. In further embodiments, the deploying process 500 may be performed by a combination of some operations performed by the vendor prior to delivery, and some operations performed after delivery of the edge device 300 to the user 308.

As shown in FIG. 5, in some embodiments, the deploying process 500 includes booting into the Recovery OS to run initial diagnostic checks at 502. For example, after powering up the edge device 300, the edge device 300 may be booted into the Recovery OS 322 (at 502) to run one or more pre-determined diagnostic evaluations to ensure that the edge device 300 has safely arrived and that all desired functionalities are successfully operational. In some embodiments, if initial diagnostic checks are successful, then the booting into the Recovery OS (at 502) may also include setting one or more relevant flags in the shared secured filesystem at 504 to enable the bootloader to choose the Application OS 312 on the subsequent reboot. In addition, in some embodiments, the booting into the Recovery OS (at 502) may also include triggering a reboot at 506.

Next, in some embodiments, the deploying process 500 includes booting into the Application OS at 508. For example, in some embodiments, the booting into the Application OS (at 508) includes loading the user application(s) 306, the debugging application(s) 310, the hardware driver (s) 311, and any other suitable components that are to be set up or configured in order to perform the desired user-specific operations using the edge device 300.

With continued reference to FIG. 5, in some embodiments, the deploying process 500 further includes configuring the edge device with configuration details (e.g. wifi setup, SSO sign in, APO key configuration, etc.) at 510. For example, in some embodiments, the configuring of the edge device (at 510) may include scanning a quick response (QR) code at 512, wherein the QR code may either contain the necessary configuration information, or may cause the edge device 300 to fetch the configuration information from a predefined URL (Uniform Resource Locator). In some embodiments, the configuring of the edge device (at 510) may include configuring one or more configuration details manually at 514, such as by the user 308 (or the operator 330) manually inputting one or more configuration details provided by an online portal, a manual, or other suitable source. Of course, in further embodiments, the configuring of the edge device (at 510) may include any other suitable mechanisms or actions for configuring the edge device 300 with configuration details to provide the necessary or desired functionalities for the user 308.

In addition, in some embodiments, the deploying process 500 may include storing device configuration details on the secure shared filesystem at 516. For example, in some embodiments, the configuration details may be stored (at 516) on the secure shared filesystem 326 in a "read only" fashion so that the configuration details may be accessed and recovered by either the Application OS 312 or the Recovery OS 322. Specifically, in some embodiments, the stored configuration details (at 516) may be used by the Application OS 312 during normal functioning of the edge device, such as for setting up device-specific parameters like boot screen animation, default brightness, volume settings, network configuration, telemetry endpoints, device credentials, or any other suitable configuration details. And in some embodiments, the stored configuration details (at 516) may be used by either the Application OS 312 or the Recovery OS 322, such as the device credentials or keys, to provide a bidirectional channel for the operator 330 (or the management device 114) to remotely communicate with the edge device 300 via a secured channel 332 to analyze or debug application issues, to perform diagnostics checks, to analysis and diagnose operating conditions, to determine remedial operations, to restore operations of the edge device 300, or to perform any other suitable management operations. After storing device configuration details (at 516), the deploying process 500 may end or continue to other operations at 518.

Figure 6:
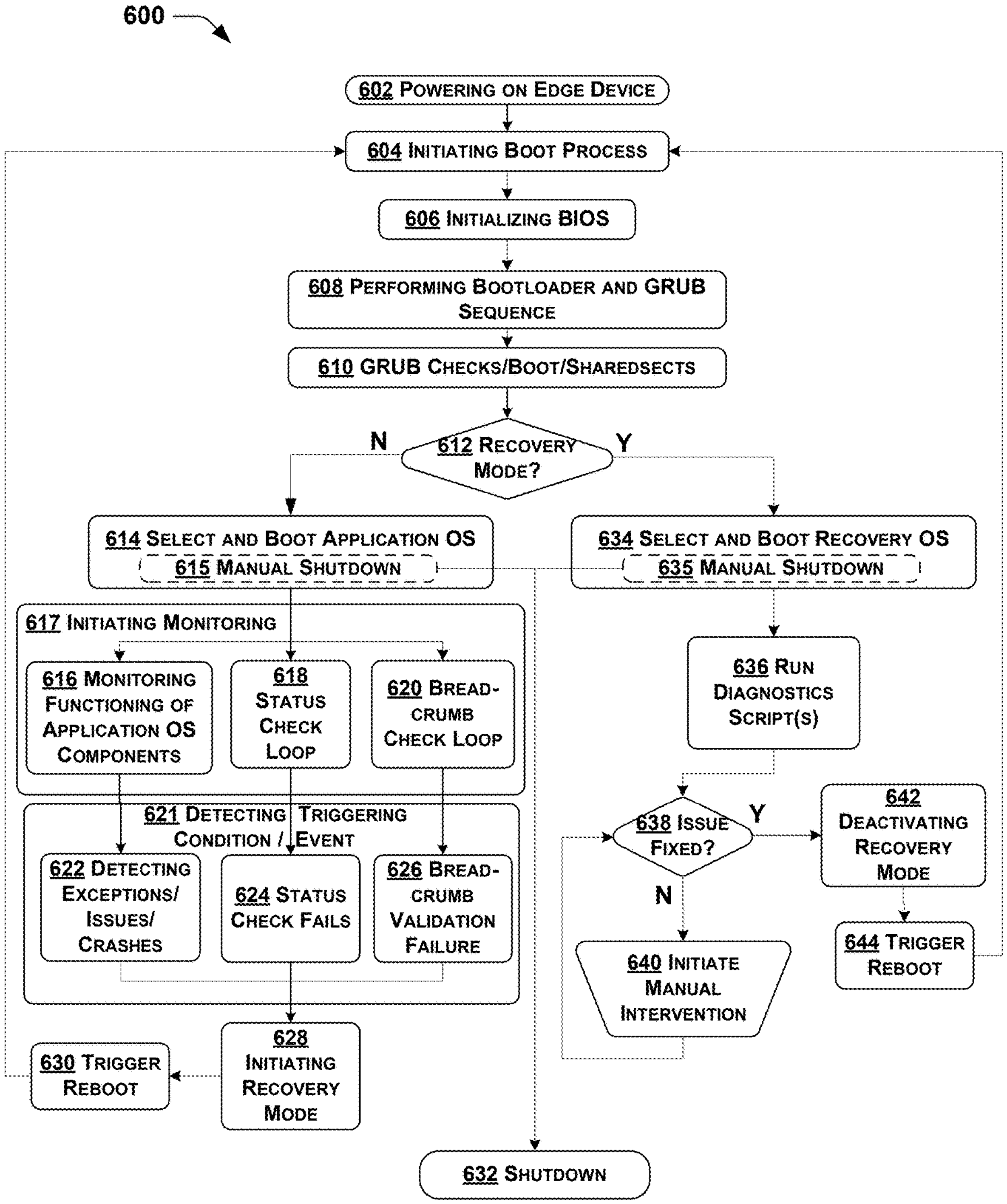
FIG. 6 shows another embodiment of a process of operating an edge device in accordance with the present disclosure.

Additional details and aspects of techniques and technologies that enable remote management of edge devices without physical access will now be described. For example, FIG. 6 shows another embodiment of a process 600 of operating an edge device (e.g. edge device 300) in accordance with the present disclosure. It will be appreciated that the exemplary process 600 contemplates that provisioning (e.g. process 400 of FIG. 4) and deploying (e.g. process 500 of FIG. 5) have already been performed.

In some embodiments, the process 600 includes powering on the edge device at 602, and initiating a boot process at 604. In some embodiments, the process 600 also includes initializing a BIOS (Basic Input/Output System) at 606, and performing a bootloader and GRUB sequence at 608. In some embodiments, the GRUB performs various checking of configuration components at 610. Unlike some other GRUB sequences, however, in some embodiments, the GRUB sequence (at 608, 610) may typically include a dynamic sequence, which may be different from other static sequences. For example, in some embodiments, the GRUB checks a flag (e.g. "Recovery Mode" flag as described more fully below) before deciding to boot the Application OS 312 or the Recovery OS 322. In some embodiments, as described more fully below, the flag may be set by the Recovery OS 322 and may be "True" by default, which means the edge device 300 will boot into a recovery mode if nothing changes.

As further shown in FIG. 6, in some embodiments, the process 600 determines whether the edge device should enter recovery mode at 612. More specifically, in some embodiments, the process 600 determines whether the edge device 300 should enter recovery mode (at 612) by checking a recovery mode flag (or other suitable indicator) that may be stored on the shared secure file system 326. For example, in some embodiments, the recovery mode flag may be set to "TRUE" if one or more issues or errors have previously been detected in the operating characteristics of the edge device 300, and may otherwise be set to "FALSE" when the edge device 300 is operating properly. It will be appreciated that, in some embodiments, the determining whether to enter recovery mode (at 612) may be considered to be part of the GRUB operations (at 608 or 610).

If it is determined (at 612) that the edge device should not enter recovery mode, then the process 600 may proceed to selecting and booting the Application OS at 614. For example, in some embodiments, the successful booting of the Application OS 312 (at 614) includes the user application 306 bootstrapping using the configuration details previously stored on the shared secure file system 326 (e.g. during provisioning 400 and deploying 500).

And in some embodiments, following (or during) the successful booting of the Application OS 312 (at 614), the process 600 includes initiating one or more monitoring operations running on the edge device at 617. For example, in some embodiments, the initiating monitoring (at 617) includes initiating monitoring of the functioning of the Application OS components at 616, including the monitoring of the user application 306 that is the primary application that the user 308 interacts with during use of the edge device 300. Similarly, the initiating monitoring (at 617) may include initiating a status check loop using a status check daemon at 618. In some embodiments, the status check daemon may be a background application that may check the status of, for example, the user application 306, one or more external systems (e.g. an HTTP URL) for validation, or any other suitable components or parameters. And in some embodiments, the initiating monitoring (at 617) may include initiating a breadcrumb check loop using a breadcrumb check daemon at 620. In some embodiments, the breadcrumb check daemon may be a background application that may check for one or more predefined status conditions in the edge device 300. It will be appreciated that although three specific types of monitoring operations are shown in FIG. 6, in alternate embodiments, one or more of these monitoring operations may be eliminated, or changed, or one or more different monitoring operations may be added or used to replace the particular monitoring operations shown in the exemplary process 600.

In some embodiments, after the initiating of monitoring (at 617), the process 600 may include detecting a triggering condition or event at 621, which may cause the Application OS 312 (or any other suitable component of the edge device 300) to trigger a reboot of the edge device 300 into the recovery mode (e.g. booting of the Recovery OS 322). For example, as depicted in FIG. 6, in some embodiments, the process 600 includes detecting one or more exceptions, issues, or crashes at 622, detecting a status check failure at 624, and detecting a breadcrumb validation failure at 626. Again, although three specific types of triggering conditions are shown in FIG. 6, in alternate embodiments, one or more of these triggering conditions may be eliminated, or changed, or one or more different triggering conditions may be added or used to replace the particular triggering conditions shown in the exemplary process 600.

It will be appreciated that a wide variety of conditions and events may be experienced by the edge device 300 that may result in the process 600 determining that a triggering condition has been detected (at 621). For example, in some embodiments, the user application 306 may raise one or more types of events when it encounters operational anomalies, invalid user inputs, or various other operating conditions. When detected (at 622), such events may be categorized into fatal and non-fatal exceptions (when detected at 622). In some embodiments, at least some non-fatal exceptions that may occur during the normal functioning of the user application 306 may be fixable by conventional safety mechanisms of the Application OS 312. Such non-fatal exceptions may include, for example, known or predicted application errors, catch-able kernel errors, and other known scenarios that can be protected against. Accordingly, in some embodiments, at least some non-fatal exceptions (when detected at 622) may not be considered triggering conditions or events that result in the process 600 entering a recovery mode.

In some embodiments, however, at least some fatal exceptions (when detected at 622) cannot be fixed by the conventional safety mechanisms of the Application OS 312, and such fatal exceptions may be considered triggering conditions or events that result in the process 600 entering the recovery mode, as described more fully below. Moreover, in some embodiments, at least some fatal exceptions may cause the Application OS 312 to crash, and may also cause any communication channels between the edge device 300 and the operator 322 to be rendered unusable. Accordingly, in some embodiments, while some fatal exceptions may result in the initiation of recovery mode, in general, not all fatal exceptions that the edge device 300 may experience may result in the initiation of recovery mode, as described more fully below.

It will be appreciated that at least some fatal exceptions can be at multiple levels: either at application level or the OS (Application OS 312) level. In some embodiments, for application-level exceptions, most of these can be predictably recovered from, however, there may be at least some scenarios where application exceptions trigger a recovery mode. Alternately, in some embodiments, OS-level exceptions may have a higher probability of triggering recovery mode. For example, the Application OS 312 may trigger a reboot in case of security breaches, which is not technically an exception but an anomaly from the expected behavior. In some embodiments, another example may include the following: during the regular use of the user application 306 by the user 308, the user application 306 may suddenly gain one or more elevated permissions (e.g. if a malicious user gained access to the edge device 300 and exploited the application vulnerabilities). In this situation, in some embodiments, even though the user application 306 has not triggered an exception or crashed, the Application OS 312 may still trigger a recovery mode reboot.

In addition, in some embodiments, at least some status check failures (when detected at 624) may result in the initiation of recovery mode. For example, when a status check daemon encounters an invalid state (e.g. an external HTTP URL being unreachable, a sock file on the edge device 300 being unavailable, the user application not responding to a user input for a specified duration, etc.), then the status check daemon may determine that a triggering condition has been detected and may take one or more other actions to initiate recovery mode (e.g. by setting the recovery mode flag to "TRUE"). Similarly, in some embodiments, if the user application 306 crashes or goes into an inconsistent state, then a status check daemon will determine that a triggering condition has been detected and the status check loop will fail (at 624).

In some embodiments, at least some breadcrumb check failures (when detected at 626) may result in the initiation of recovery mode. For example, a breadcrumb check daemon may configured to compare one or more states of the edge device 300 against a one or more pre-defined (or expected) states and to evaluate one or more differences that may occur. In some embodiments, the states may be defined in terms of one or more hardware metrics and/or software metrics, and may vary depending upon a variety of configuration variables (e.g. device type, OS type, other configuration parameters, etc.). During evaluation of a state, the breadcrumb check daemon may compare a current state with an ideal or expected state that may, for example, be stored on a memory 302 of the edge device 300.

In some embodiments, if the breadcrumb check daemon determines that the current state is within an acceptable range of the expected state, then the breadcrumb check daemon may update the storage with the latest value(s) and may move on to evaluating another state. Alternately, in some embodiments, if the breadcrumb check daemon determines that the current state is not within an acceptable range of the expected state, then the breadcrumb check daemon may provide an indication of a breadcrumb check failure and/or an indication that a triggering condition has occurred (at 626). For example, in some embodiments, a state that may be compared and evaluated by a breadcrumb check daemon may be a RAM (Random Access Memory) utilization. For example, during one of the passes of the breadcrumb check daemon, if the average RAM utilization is above a specified value (e.g. 80%) for a specified period (e.g. the past 24 hours of edge device operation), then in some embodiments, the breadcrumb check daemon may declare that the current state is not within an acceptable range of the expected state. In some embodiments, upon determining that a triggering condition has been detected, the breadcrumb check daemon may take one or more other actions to initiate recovery mode (e.g. by setting the recovery mode flag to "TRUE"). Additional possible aspects and implementations of breadcrumb check operations are described more fully below with respect to FIG. 7.

With continued reference to FIG. 6, in some embodiments, upon the detecting an occurrence of one or more triggering conditions (at 621) (e.g. application crashing, kernel panics, breadcrumb failure, etc.), the process 600 may include initiating a recovery mode at 628. For example, in some embodiments, the initiating of recovery mode (at 628) may include setting a recovery mode flag to an appropriate value (e.g. "TRUE"), and then storing the recovery mode flag on the shared secure file system 326 for subsequent access during or following reboot operations (e.g. by the bootloader and GRUB sequence at 612). Next, in some embodiments, the process 600 may include triggering a reboot of the edge device 300 at 630, whereupon the process 600 returns to initiating the boot process at 604.

More specifically, regardless of how the triggering condition is detected (at 621), in some embodiments, the Application OS 312 may detect or "catch" the occurrence of the triggering condition, and may perform the following operations: (a) the Application OS 312 may take one or more other actions to initiate recovery mode (at 628) (e.g. by setting the recovery mode flag to "TRUE"); (b) write information regarding the triggering condition (e.g. crash of user application 306), including relevant metadata, into the shared secure filesystem 326; and (c) initiate reboot of the edge device 300 (at 630).

In some embodiments, after returning to the initiating a boot process (at 604), the process 600 may include repeating the above-noted boot operations (e.g. initializing a BIOS (at 606), performing a bootloader and GRUB sequence (at 608), and performing a GRUB check of configuration components (at 610)), and may return to determining whether the edge device should enter recovery mode (at 612). Because recovery mode has previously been initiated (at 628) (e.g. by setting the recovery mode flag to "TRUE"), then the process 600 determines that the edge device 300 should enter recovery mode (at 612). More specifically, in some embodiments, during the reboot operations, the process 600 may access the recovery mode flag from the shared secure filesystem 326 (e.g. when determining whether to enter recovery mode at 612).

When it is determined that recovery mode should be entered (at 612), then the process 600 may proceed to selecting and booting the Recovery OS at 634. In some embodiments, the Recovery OS 322 may have access to information stored on the shared secure filesystem 326, including information stored there by the Application OS 322 during operation of the edge device 300. For example, in some embodiments, the information stored on the shared secure filesystem 326 by the Application OS 322 that is accessible by the Recovery OS 322 may include one or more exceptions experienced during operation of the edge device 300, the last operating state(s) or configuration(s) of the edge device 300, information regarding one or more status or breadcrumb conditions, or any other suitable information.

In some embodiments, as depicted in FIG. 6, the process 600 may include two mechanisms for attempting to restore the edge device 300 to normal operations. In an Automated Device Recovery (ADR), the process 600 may automatically diagnose and resolve one or more anomalous operating conditions of the edge device 300. Alternately, if the ADR is unsuccessful, then the process 600 may include a Manual Device Recovery (MDR) that involves human intervention to diagnose and resolve the issues.

As shown in FIG. 6, in some embodiments, after the Recovery OS 322 is booted (at 634), the process 600 may include running (or attempting to run) one or more diagnostic scripts on the edge device at 636. In some embodiments, the one or more diagnostic scripts that are run (at 636) may have been previously loaded or stored on the edge device 300 (e.g. in memory 302, in recovery partition 314, in shared secure filesystem 326, etc.) in anticipation of possible triggering conditions that may cause entry into recovery mode. In other embodiments, one or more of the diagnostic scripts that are run (at 636) may be provided or retrieved from other sources, such as by the management device 114 (e.g. via a secured connection), or from any other suitable source via (e.g. from a URL via an unsecured connection).

More specifically, in some embodiments, the running (or attempting to run) one or more diagnostic scripts on the edge device at 636 may attempt to restore one or more components of the edge device 300 (e.g. the Application OS 312, the user application 306, etc.) to a properly working state. For example, in some embodiments, the running of one or more diagnostic scripts (at 636) may include the Recovery OS 322 running a series of diagnostic tests for a kernel of the Application OS 312 and installed user application(s) 306. Similarly, in some embodiments, the running of one or more diagnostic scripts (at 636) may include the Recovery OS 322 communicating with one or more external systems (e.g. management device 114) using one or more APIs (Application Programming Interfaces) to gather additional data that may facilitate diagnosis, evaluation, or remedial action for the edge device 300.

In some embodiments, the running (or attempting) of one or more diagnostic scripts on the edge device (at 636) may include operations that attempt to fix or resolve the one or more issues that caused the one or more triggering conditions to be detected (at 621). Specifically, in some embodiments, the Recovery OS 322 may run one or more diagnostic scripts that not only diagnose or evaluate issues, but also take steps to resolve such issues through, for example, predefined heuristics, scripts, or any other suitable remediation mechanisms.

For example, in some embodiments, the running of one or more diagnostic scripts (at 636) may include the Recovery OS 322 determining that a particular component of the edge device 300 should be reloaded. This may occur due to a variety of reasons (e.g. SHA (Secure Hashing Algorithm) mismatch for application binary or configuration, corrupted component, required update available, etc.). Accordingly, in some embodiments, the Recovery OS 322 may pull or otherwise obtain a correct version of the affected component and install it onto the edge device 300. In some embodiments, the Recovery OS 322 may send one or more relevant telemetry updates to the management device 114 (or other suitable location) for further analysis.

Next, the process 600 shown in FIG. 6 may further include determining whether the issue has been fixed at 638. For example, in some embodiments, the Recovery OS 322 may perform one or more evaluation operations to check whether the one or more triggering conditions that caused the edge device 300 to enter recovery mode have been resolved (e.g. component has been successfully re-installed, etc.). If it is determined that the issue has been successfully fixed (at 638) by the running of the one or more diagnostic scripts (at 636), then Automated Device Recovery (ADR) has been successful, and there is no need at this time to proceed to Manual Device Recovery.

More specifically, in some embodiments, if it is determined that the issue has been successfully fixed (at 638), then the process 600 may proceed to deactivating of recovery mode at 642. For example, in some embodiments, the deactivating of recovery mode (at 642) includes the Recovery OS 322 re-setting the recovery mode flag to an appropriate value (e.g. "FALSE"), and then storing the recovery mode flag on the shared secure file system 326 for subsequent access during or following reboot operations (e.g. by the bootloader and GRUB sequence at 612). And in some embodiments, the deactivating of recovery mode (at 642) includes the Recovery OS 322 updating the boot order to make the Application OS 312 as active in the next reboot of the edge device 300. Next, after deactivating recovery mode (at 642), the process 600 includes triggering a reboot of the edge device 300 at 644, whereupon the process 600 returns to initiating the boot process at 604.

Alternately, in some embodiments, if it is determined (at 638) that the issue has not been successfully resolved by the running of diagnostic scripts (at 636) (i.e. ADR has been unsuccessful and MDR is needed), then the process 600 may proceed to initiating manual intervention at 640. For example, in some embodiments, initiating manual intervention (at 640) may include the operator 330 accessing the edge device 300 (e.g. using the management device 114 via the secure connection) to perform diagnosis of issues and to attempt possible remedial operations. More specifically, in some embodiments, initiating manual intervention (at 640) includes the Recovery OS 322 issuing an alert via an API call to an external system (e.g. management device 114) to notify the operator 330. In some embodiments, upon notification, the operator 330 may use the bi-directional communication mechanism to run further diagnostics checks and commands to resolve issues and return the edge device 300 into a usable state.

Upon determining that the actions of the operator 330 have successfully resolved the issues (at 638) (i.e. MDR is successful), then the process 600 includes deactivating recovery mode (at 642), such as by the operator 330 running one or more additional diagnostics scripts that will set the right flags in the shared secure filesystem 328 which will cause the bootloader to choose the Application OS 312 on the next reboot. Once the boot order is changed (at 642), then the operator 330 may trigger a reboot (at 644), causing the process 600 returns to initiating the boot process at 604.

After returning to the initiating a boot process (at 604), the process 600 may include repeating the above-noted boot operations (e.g. initializing a BIOS (at 606), performing a bootloader and GRUB sequence (at 608), and performing a GRUB check of configuration components (at 610)), and may return to determining whether the edge device should enter recovery mode (at 612). Because recovery mode has previously been deactivated (at 642) (e.g. by setting the recovery mode flag to "FALSE"), then the process 600 determines that the edge device 300 should not enter recovery mode (at 612). Therefore, the process 600 returns to selecting and booting the Application OS (at 614), and resumes normal operations of the edge device 300.

It will be appreciated that if problems or issues persist with the edge device 300, then the process 600 may be repeated indefinitely (e.g. operations 614 through 644) until all issues have been successfully resolved (either through ADR, MDR, or a combination of both), or until the edge device 300 is reprovisioned, redeployed, or retired.

As further depicted in FIG. 6, the operations of the edge device 300 may be manually terminated at virtually any time or during any operation. For example, in the process 600, a manual shutdown at 615 may occur during normal operations of the edge device 300, such as during the operation of the Application OS 306. Similarly, a manual shutdown at 635 may occur during recovery mode operations of the edge device 300, such as during the operation of the Recovery OS 322. Accordingly, upon manual shutdown of the edge device 300 (at 615, 635), the process 600 proceeds to shutdown at 632.

Occasionally, the edge device 300 may experience an abrupt loss of power without the user 308 intending to shut down the edge device 300. In the case of an unintended abrupt power loss, in some embodiments, the process 600 may proceed as follows: (a) if the last status check loop was successful (at 618) then the edge device 300 may reboot after the power loss into the Application OS 312 and resume normal operations (at 614), however, (b) if the last status check loop was unsuccessful (at 618, 624), then the edge device 300 may reboot after the power loss into the Recovery OS 322 in recovery mode, and perform ADR and/or MDR operations (e.g. operations 634 through 644) to attempt to resolve whatever issues may have occurred.

Figure 7:
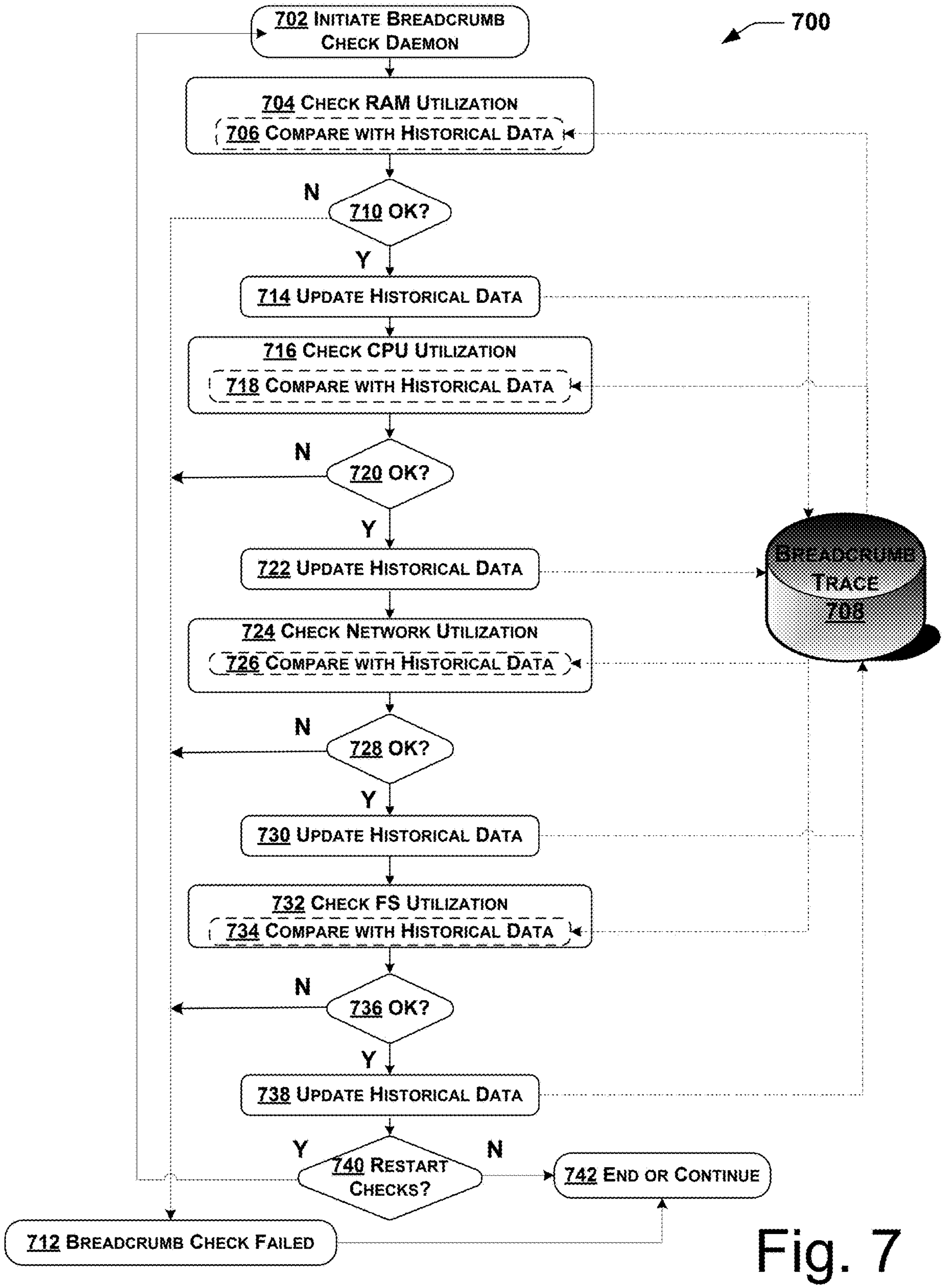
FIG. 7 shows an embodiment of a breadcrumb check process in accordance with the present disclosure.

As noted above, determining whether a triggering condition has occurred (at 621) by detecting breadcrumb validation failures (at 626) may have a wide variety of possible implementations. For example, FIG. 7 shows an embodiment of a breadcrumb check process 700 in accordance with the present disclosure. In some embodiments, the process 700 includes initiating a breadcrumb check daemon at 702, and checking RAM utilization using the breadcrumb check daemon at 704. More specifically, in some embodiments, the checking RAM utilization (at 704) may include comparing actual RAM utilization to historical data regarding RAM utilization at 706. In some embodiments, the historical data regarding RAM utilization may be obtained from a breadcrumb trace database 708 or other suitable source of historical data. If it is determined that RAM utilization is not within an acceptable range or condition at 710, then the process 700 may proceed to declaring that a breadcrumb check failure has occurred at 712. Alternately, if it is determined that RAM utilization is within an acceptable range or condition (at 710), then the process 700 may include updating the RAM historical data at 714 (e.g. by writing back to the breadcrumb trace database 708).

In addition, in some embodiments, the process 700 includes checking CPU (Central Processing Unit) utilization using the breadcrumb check daemon at 716. More specifically, in some embodiments, the checking CPU utilization (at 716) may include comparing actual CPU utilization to historical data regarding CPU utilization at 718. In some embodiments, the historical data regarding CPU utilization may be obtained from the breadcrumb trace database 708 or other suitable source of historical data. If it is determined that CPU utilization is not within an acceptable range or condition at 720, then the process 700 may proceed to declaring that a breadcrumb check failure has occurred (at 712). Alternately, if it is determined that CPU utilization is within an acceptable range or condition (at 720), then the process 700 may include updating the CPU historical data at 722 (e.g. by writing back to the breadcrumb trace database 708).

Similarly, in some embodiments, the process 700 includes checking network utilization using the breadcrumb check daemon at 724. More specifically, in some embodiments, the checking network utilization (at 724) may include comparing actual network utilization to historical data regarding network utilization at 726. In some embodiments, the historical data regarding CPU utilization may be obtained from the breadcrumb trace database 708 or other suitable source of historical data. If it is determined that network utilization is not within an acceptable range or condition at 728, then the process 700 may proceed to declaring that a breadcrumb check failure has occurred (at 712). Alternately, if it is determined that network utilization is within an acceptable range or condition (at 728), then the process 700 may include updating the network historical data at 730 (e.g. by writing back to the breadcrumb trace database 708).

And in some embodiments, the process 700 includes checking FS (File System) utilization using the breadcrumb check daemon at 732. More specifically, in some embodiments, the checking FS utilization (at 732) may include comparing actual FS utilization to historical data regarding FS utilization at 734. In some embodiments, the historical data regarding FS utilization may be obtained from the breadcrumb trace database 708 or other suitable source of historical data. If it is determined that FS utilization is not within an acceptable range or condition at 736, then the process 700 may proceed to declaring that a breadcrumb check failure has occurred (at 712). Alternately, if it is determined that FS utilization is within an acceptable range or condition (at 736), then the process 700 may include updating the FS historical data at 738 (e.g. by writing back to the breadcrumb trace database 708).

As further shown in FIG. 7, in some embodiments, the process 700 includes determining whether to restart the breadcrumb checking operations at 740. If so, then the process 700 returns to initiating the breadcrumb check daemon (at 702), and the above-described breadcrumb checking operations (at 704 through 738) may be repeated. If it is determined, however, that breadcrumb checking operations should not be restarted (at 740), or if after any breadcrumb checking operations a breadcrumb check failure is declared (at 712), then the process 700 ends or continues to other operations at 742. It will be understood that the process 700 is merely one possible example of a breadcrumb checking process, and that a wide variety of other possible breadcrumb checking processes may be conceived, and that techniques and technologies in accordance with the present disclosure are not limited to the particular breadcrumb checking operations shown or described herein.

Figure 8:
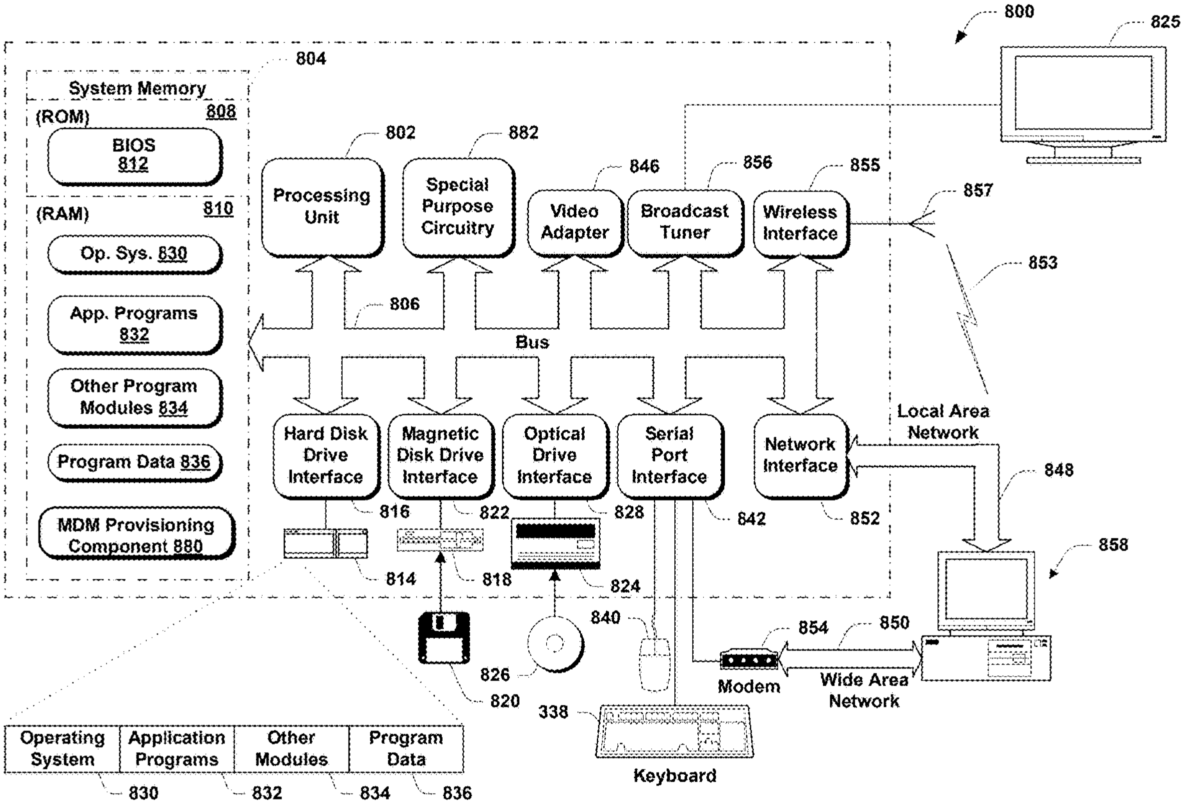
FIG. 8 is a schematic view of an embodiment of a management system in accordance with the present disclosure.

It will be appreciated that techniques and technologies in accordance with the present disclosure may be implemented in a variety of systems, devices, and environments. For example, FIG. 8 is a schematic view of an exemplary management system 800 (e.g. the management device 114 of FIG. 1) in accordance with another possible embodiment. In some embodiments, the system 800 may include one or more processors (or processing units) 802, special purpose circuitry 882, a memory 804, and a bus 806 that couples various system components, including the memory 804, to the one or more processors 802 and special purpose circuitry 882 (e.g. ASIC, FPGA, etc.). The bus 806 represents one or more of any of several types of bus structures, including a memory bus or memory controller, a peripheral bus, an accelerated graphics port, and a processor or local bus using any of a variety of bus architectures. In this implementation, the memory 804 includes read only memory (ROM) 808 and random access memory (RAM) 810. A basic input/output system (BIOS) 812, containing the basic routines that help to transfer information between elements within the system 800, such as during start-up, is stored in ROM 808.

The exemplary system 800 further includes a hard disk drive 814 for reading from and writing to a hard disk (not shown), and is connected to the bus 806 via a hard disk driver interface 816 (e.g., a SCSI, ATA, or other type of interface). A magnetic disk drive 818 for reading from and writing to a removable magnetic disk 820, is connected to the system bus 806 via a magnetic disk drive interface 822. Similarly, an optical disk drive 824 for reading from or writing to a removable optical disk 826 such as a CD ROM, DVD, or other optical media, connected to the bus 806 via an optical drive interface 828. The drives and their associated computer-readable media provide nonvolatile storage of computer readable instructions, data structures, program modules and other data for the system 800. Although the exemplary system 800 described herein employs a hard disk, a removable magnetic disk 820 and a removable optical disk 826, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 8, a number of program modules may be stored on the memory 804 (e.g. the ROM 808 or the RAM 810) including an operating system 830, one or more application programs 832, other program modules 834, and program data 836 (e.g. the data store 820, image data, audio data, three dimensional object models, etc.). Alternately, these program modules may be stored on other computer-readable media, including the hard disk, the magnetic disk 820, or the optical disk 826. For purposes of illustration, programs and other executable program components, such as the operating system 830, are illustrated in FIG. 8 as discrete blocks, although it is recognized that such programs and components reside at various times in different storage components of the system 800, and may be executed by the processor(s) 802 or the special purpose circuitry 882 of the system 800.

A user may enter commands and information into the system 800 through input devices such as a keyboard 838 and a pointing device 840. Other input devices (not shown) may include a microphone, joystick, game pad, satellite dish, scanner, or the like. These and other input devices are connected to the processing unit 802 and special purpose circuitry 882 through an interface 842 that is coupled to the system bus 806. A monitor 825 may be connected to the bus 806 via an interface, such as a video adapter 846. In addition, the system 800 may also include other peripheral output devices (not shown) such as speakers, cameras, scanners, and printers.

The system 600 may operate in a networked environment using logical connections to one or more remote computers (or servers) 658. Such remote computers (or servers) 658 may be a personal computer, a server, a router, a network PC, a peer device or other common network node, and may include many or all of the elements described above relative to system 600. The logical connections depicted in FIG. 8 may include one or more of a local area network (LAN) 848 and a wide area network (WAN) 850. Such networking environments are commonplace in offices, enterprise-wide computer networks, intranets, and the Internet. In a networked environment, program modules depicted relative to the system 800, or portions thereof, may be stored in the memory 804, or in a remote memory storage device.

In this embodiment, the system 800 also includes one or more broadcast tuners 856. The broadcast tuner 856 may receive broadcast signals directly (e.g., analog or digital cable transmissions fed directly into the tuner 856) or via a reception device (e.g., via a sensor, an antenna, a satellite dish, etc.).

When used in a LAN networking environment, the system 800 may be connected to the local network 848 through a network interface (or adapter) 852. When used in a WAN networking environment, the system 800 typically includes a modem 854 or other means for establishing communications over the wide area network 850, such as the Internet. The modem 854, which may be internal or external, may be connected to the bus 806 via the serial port interface 842. Similarly, the system 800 may exchange (send or receive) wireless signals 853 with one or more remote devices, using a wireless interface 855 coupled to a wireless communicator 857.

As further shown in FIG. 8, a mobile device management (MDM) component 880 may be stored in the memory 804 of the system 800. The MDM component 880 may be configured to perform operations as disclosed herein, including operations associated with provisioning and testing of edge devices remotely without physical access via one or more networks, and may be implemented using software, hardware, firmware, or any suitable combination thereof. In cooperation with the other components of the system 800, such as the processing unit 802 or the special purpose circuitry 882, the MDM component 880 may be operable to perform one or more implementations of processes for provisioning and testing of MDM agents (or other software) as described herein in accordance with the present disclosure.

Accordingly, based on the foregoing discussion and the accompanying figures, techniques and technologies in accordance with the present disclosure may have a variety of suitable embodiments. For example, in some embodiments, a device comprises: at least one processor; a memory operatively coupled to the at least one processor, the memory storing processor-readable instructions configured to perform operations including at least: booting a user configuration using an application operating system, the user configuration including at least a user application configured to operate on the application operating system; operating the user configuration using the application operating system; monitoring data related to the operation of the user configuration; detecting a triggering condition during operation of the user configuration indicative of an erroneous operating condition of the user configuration; rebooting in a recovery operating system, the recovery operating system being configured to boot by default one or more analysis components configured to attempt to remedy the erroneous operating condition, the recovery operating system being further configured to not boot by default any components that were booted by the application operating system that could have caused the erroneous operating condition; and operating one or more analysis components booted by the recovery operating system to attempt to diagnose a cause of the erroneous operating condition.

Similarly, in some embodiments, the operations further comprise: operating one or more analysis components booted by the recovery operating system to attempt to remedy the cause of the erroneous operating condition. And in some embodiments, the operations further comprise: rebooting the user configuration using the application operating system; and re-operating the user configuration using the application operating system following the attempt to remedy the cause of the erroneous operating condition. In some embodiments, the operations further comprise: upon detecting the triggering condition during operation of the user configuration, writing at least some data indicative of an operating state of the user configuration to a shared secure filesystem.

In further embodiments, the operating one or more analysis components booted by the recovery operating system to attempt to diagnose a cause of the erroneous operating condition comprises: operating one or more analysis components booted by the recovery operating system to attempt to diagnose a cause of the erroneous operating condition using least some data indicative of the operating state of the user configuration obtained from the shared secure filesystem. And in some embodiments, the monitoring data related to the operation of the user configuration comprises: at least one of: monitoring data related to the operation of the user application; monitoring data related to at least part of the application operating system; monitoring data related to a status of the user configuration; and monitoring data related to a breadcrumb evaluation of the user configuration.

In still further embodiments, the monitoring data related to the operation of the user configuration comprises: monitoring data related to a breadcrumb evaluation of the user configuration, the breadcrumb evaluation including an evaluation of at least one of: a RAM utilization, a CPU utilization, a network utilization, or a file system utilization.

And in some embodiments, the recovery operating system comprises: a recovery operating system that is configured to boot by default verified components that could not have caused the erroneous operating condition. In further embodiments, the recovery operating system comprises: a recovery operating system that is not accessible by the user application of the user configuration. And in some embodiments, the user configuration is stored on an application partition of the memory, and the recovery operating system is stored on a recovery partition of the memory.

Additionally, in some embodiments, the operating one or more analysis components booted by the recovery operating system to attempt to diagnose a cause of the erroneous operating condition comprises: operating one or more scripts to attempt to diagnose the cause of the erroneous operating condition. And in some embodiments, the operating one or more analysis components booted by the recovery operating system to attempt to diagnose a cause of the erroneous operating condition comprises: performing a breadcrumb evaluation of the user configuration, the breadcrumb evaluation including an evaluation of at least one of: a RAM utilization, a CPU utilization, a network utilization, or a file system utilization.

Alternately, in some embodiments, a device comprises: at least one processor; a memory operatively coupled to the at least one processor, the memory storing processor-readable instructions configured to perform operations including at least: operating a user configuration that includes a user application and an application operating system; detecting a triggering condition during operation of the user configuration indicative of an erroneous operating condition of the user configuration; upon detecting the triggering condition during operation of the user configuration, writing at least some data indicative of an operating state of the user configuration to a shared secure filesystem; rebooting in a recovery operating system, the recovery operating system being configured to boot by default one or more verified components that could not have caused the erroneous operating condition; and operating one or more verified components booted by the recovery operating system to attempt to diagnose a cause of the erroneous operating condition using least some data indicative of the operating state of the user configuration obtained from the shared secure filesystem.

In some embodiments, the operations further comprise: operating one or more verified components booted by the recovery operating system to attempt to remedy the cause of the erroneous operating condition. And in some embodiments, the operations further comprise: rebooting the user configuration using the application operating system following the attempt to remedy the cause of the erroneous operating condition; and re-operating the user configuration using the application operating system.

In addition, in some embodiments, the operating one or more verified components booted by the recovery operating system to attempt to diagnose a cause of the erroneous operating condition using least some data indicative of the operating state of the user configuration obtained from the shared secure filesystem comprises: operating one or more scripts to attempt to diagnose the cause of the erroneous operating condition using least some data indicative of the operating state of the user configuration obtained from the shared secure filesystem comprises.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term “component” is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:

at least one processor;

a memory operatively coupled to the at least one processor, the memory storing processor-readable instructions configured to perform operations including at least:

booting a user configuration using an application operating system, the user configuration including at least a user application configured to operate on the application operating system using a user-associated data;

operating the user configuration using the application operating system, including at least operating the user application on the application operating system using the user-associated data;

monitoring performance data related to the operation of the user configuration on the application operating system;

detecting a triggering condition in the monitored performance data during operation of the user configuration indicative of an erroneous operating condition of the user configuration;

rebooting in a recovery operating system, the recovery operating system being configured to boot by default one or more analysis components configured to attempt to remedy the erroneous operating condition, the recovery operating system being further configured to not boot by default any components that were booted by the application operating system that could have caused the erroneous operating condition; and operating one or more analysis components booted by the recovery operating system to attempt to diagnose a cause of the erroneous operating condition.

2. The device of claim 1, wherein the operations further comprise:

operating one or more analysis components booted by the recovery operating system to attempt to remedy the cause of the erroneous operating condition.

3. The device of claim 2, wherein the operations further comprise:

rebooting the user configuration using the application operating system; and re-operating the user configuration using the application operating system following the attempt to remedy the cause of the erroneous operating condition.

4. The device of claim 1, wherein the operations further comprise:

upon detecting the triggering condition in the monitored performance data during operation of the user configuration, writing at least some data indicative of an operating state of the user configuration to a shared secure filesystem.

5. The device of claim 4, wherein operating one or more analysis components booted by the recovery operating system to attempt to diagnose a cause of the erroneous operating condition comprises:

operating one or more analysis components booted by the recovery operating system to attempt to diagnose a cause of the erroneous operating condition using least some data indicative of the operating state of the user configuration obtained from the shared secure filesystem.

6. The device of claim 1, wherein monitoring performance data related to the operation of the user configuration on the application operating system comprises:

at least one of:

monitoring data related to the operation of the user application;

monitoring data related to at least part of the application operating system;

monitoring data related to a status of the user configuration; and monitoring data related to a breadcrumb evaluation of the user configuration.

7. The device of claim 1, wherein monitoring performance data related to the operation of the user configuration on the application operating system comprises:

monitoring data related to a breadcrumb evaluation of the user configuration, the breadcrumb evaluation including an evaluation of at least one of: a RAM utilization, a CPU utilization, a network utilization, or a file system utilization.

8. The device of claim 1, wherein the recovery operating system comprises: a recovery operating system that is configured to boot by default verified components that could not have caused the erroneous operating condition.

9. The device of claim 1, wherein the recovery operating system comprises: a recovery operating system that is not accessible by the user application of the user configuration.

10. The device of claim 1, wherein the user configuration is stored on an application partition of the memory, and the recovery operating system is stored on a recovery partition of the memory.

11. The device of claim 1, wherein operating one or more analysis components booted by the recovery operating system to attempt to diagnose a cause of the erroneous operating condition comprises:

operating one or more scripts to attempt to diagnose the cause of the erroneous operating condition.

12. The device of claim 1, wherein operating one or more analysis components booted by the recovery operating system to attempt to diagnose a cause of the erroneous operating condition comprises:

performing a breadcrumb evaluation of the user configuration, the breadcrumb evaluation including an evaluation of at least one of: a RAM utilization, a CPU utilization, a network utilization, or a file system utilization.

13. The device of claim 1, wherein detecting a triggering condition in the monitored performance data during operation of the user configuration indicative of an erroneous operating condition of the user configuration comprises:

detecting a non-fatal exception in the monitored performance data during operation of the user configuration.

14. The device of claim 1, wherein detecting a triggering condition in the monitored performance data during operation of the user configuration indicative of an erroneous operating condition of the user configuration comprises:

detecting an anomaly from an expected behavior that is not an exception in the monitored performance data during operation of the user configuration.

15. A device, comprising:

at least one processor;

a memory operatively coupled to the at least one processor, the memory storing processor-readable instructions configured to perform operations including at least:

operating a user configuration that includes a user application using a user-associated data on an application operating system;

detecting a triggering condition in a performance data during operation of the user configuration indicative of an erroneous operating condition of the user configuration;

upon detecting the triggering condition, writing at least some data indicative of an operating state of the user application using the user-associated data on the application operating system to a shared secure filesystem;

rebooting in a recovery operating system, the recovery operating system being configured to boot by default one or more verified components that could not have caused the erroneous operating condition, the recovery operating system being further configured to not boot by default any components that were booted by the application operating system that could have caused the erroneous operating condition; and operating one or more verified components booted by the recovery operating system to attempt to diagnose a cause of the erroneous operating condition using least some data indicative of the operating state of the user application using the user-associated data on the application operating system obtained from the shared secure filesystem.

16. The device of claim 15, wherein the operations further comprise:

operating one or more verified components booted by the recovery operating system to attempt to remedy the cause of the erroneous operating condition.

17. The device of claim 16, wherein the operations further comprise:

rebooting the user configuration using the application operating system following the attempt to remedy the cause of the erroneous operating condition; and re-operating the user configuration using the application operating system.

18. The device of claim 15, wherein operating one or more verified components booted by the recovery operating system to attempt to diagnose a cause of the erroneous operating condition using least some data indicative of the operating state of the user configuration obtained from the shared secure filesystem comprises:

operating one or more scripts to attempt to diagnose the cause of the erroneous operating condition using least some data indicative of the operating state of the user configuration obtained from the shared secure filesystem comprises.

* * * * *